United States Patent
Ganey et al.

(10) Patent No.: US 8,264,459 B2
(45) Date of Patent: Sep. 11, 2012

(54) NOISE ATTENUATION IN AND FOR COMPUTER MICE

(75) Inventors: Harriss C. Ganey, Cary, NC (US); David C. Munn, Raleigh, NC (US); John D. Swansey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1139 days.

(21) Appl. No.: 12/049,653

(22) Filed: Mar. 17, 2008

(65) Prior Publication Data

US 2009/0231279 A1    Sep. 17, 2009

(51) Int. Cl.
*G06F 3/033* (2006.01)
(52) U.S. Cl. ............ 345/163; 345/156; 463/37; 200/402
(58) Field of Classification Search .......... 345/156–163; 463/37–38; 200/402
See application file for complete search history.

(56) References Cited

U.S. PATENT DOCUMENTS

| | | | | |
|---|---|---|---|---|
| 5,633,658 A | * | 5/1997 | Ma | 345/161 |
| 6,389,140 B1 | * | 5/2002 | Wei | 381/173 |
| 7,081,593 B2 | * | 7/2006 | Hopkins | 200/402 |
| 7,710,397 B2 | * | 5/2010 | Krah et al. | 345/163 |
| 2006/0021823 A1 | * | 2/2006 | Kohara et al. | 181/290 |

FOREIGN PATENT DOCUMENTS

JP            04074671 A   *  3/1992

* cited by examiner

*Primary Examiner* — Lun-Yi Lao
*Assistant Examiner* — Sosina Abebe
(74) *Attorney, Agent, or Firm* — Ference & Associates LLC

(57) ABSTRACT

In or for a computer mouse, an insert which fits inside a mouse cavity that, at the same time, readily accommodates the actuation of mouse buttons while not interfering with other moving parts inside the mouse. Accordingly, the insert would preferably occupy space within the cavity to reduce the free volume of space that would otherwise amplify a clicking noise from one or more mouse buttons, while also serving to actually dampen the clicking noise. The insert can preferably be custom-designed as to accommodate essentially any mouse design and thereby fit readily within the otherwise unoccupied interior space of the mouse body. Preferably, the material employed for such an insert may be embodied by a sound-dampening foam.

22 Claims, 2 Drawing Sheets

NOISE ATTENUATION IN AND FOR COMPUTER MICE

FIELD OF THE INVENTION

The present invention relates generally to computer mice and to methods and arrangements for managing mechanical or other noise associated with same.

BACKGROUND OF THE INVENTION

Many conventional computer mouse designs involve a leaf switch, or a switch biased in the manner of a leaf spring, whereby once a user presses a mouse button the leaf switch will "click" and urge the button to return to its original (raised) position once the user removes his or her finger(s) from the button. More particularly, a leaf switch normally involves thin pieces of metal that present a resistance to being pushed out of an initial rest position (i.e., to being pushed downwardly) but, once pushed down, actually make contact with another metal component to complete a circuit.

The action just described applies readily to the actuation of essentially any button that might be on the mouse (e.g., a "left-click" button, a "right-click" button, or other buttons). As is well known, a clicking noise is created in view of the resonant properties of the mouse cavity, which normally encompasses at least one major hollow space within the mouse body. More particularly, actuation of the switch already creates a significant clicking noise, while resonant qualities of the interior mouse cavity serve to amplify this effect. This phenomenon, quite ironically, has presented even more of a problem with the advent of "optical" mice, which involve tracking typically via a laser light disposed in and emanating from the bottom of the mouse, as compared to "mechanical" or "trackball" mice, which involve tracking typically via a rotatable trackball disposed at the bottom of the mouse. The reason for the worsening of the problem is simply that an optical mouse typically presents a greater proportion of open volume within the mouse body than does a mechanical mouse, since an optical mouse has fewer (and normally less bulky) mechanical parts.

In addressing this noise problem, alternative switches or buttons have been developed, such as a rubber dome switch. The tradeoff is that these alternative switch designs, like the rubber dome switch, do not retain the tactile feel of the leaf-style switch. This also creates an unenviable problem in that the user is provided with no auditory feedback either, indicating to him/her that the switch indeed has been actuated. There is also a pattern of user errors being caused by the rubber dome switch, since the user must keep a constant force on the switch in order to perform tasks (e.g., drag and drop) and since the user would not know that the button had not remained depressed unless they saw the result of the error on the screen.

In view of the foregoing, a compelling need has been recognized in connection with providing arrangements in computer mice that significantly attenuate the characteristic mouse clicking noise, without compromising the user's ability to receive feedback or reassurance that a task related to mouse clicking has indeed been executed.

SUMMARY OF THE INVENTION

In accordance with at least one presently preferred embodiment of the present invention, there is broadly contemplated herein the provision of an insert which fits inside a mouse cavity that, at the same time, readily accommodates the actuation of mouse buttons while not interfering with other moving parts inside the mouse. Accordingly, the insert would preferably occupy space within the cavity to reduce the free volume of space that would otherwise amplify a clicking noise from one or more mouse buttons, while also serving to actually dampen the clicking noise.

The insert can preferably be custom-designed as to accommodate essentially any mouse design and thereby fit readily within the otherwise unoccupied interior space of the mouse body. Preferably, the insert includes sufficient spaces therewithin as to permit any and all arms and switches and other moving components (such as components associated with the mouse buttons or with other elements of the mouse, such as a tracking ball) to move freely. Also, it preferably is configured to avoid disrupting or interfering with a printed circuit board (PCB) contained therewithin or with any laser housing (if the mouse has a laser-based tracking system).

Preferably, the material employed for such an insert may be embodied by a sound-dampening foam.

In summary, one aspect of the invention provides an apparatus comprising: a shell defining an interior space therewithin; a movable component which displaces with respect to the shell; and a noise attenuator which attenuates noise created by the movable component; the noise attenuator being disposed within the shell; the noise attenuator occupying space within the shell to decrease acoustic resonance within the shell while permitting free movement of the movable component.

Furthermore, an additional aspect of the invention provides a system comprising: a main memory; a system processor; an input/output controller; and a mouse communicable with the input/output controller; the mouse comprising: a shell defining an interior space therewithin; a movable component which displaces with respect to the shell; and a noise attenuator which attenuates noise created by the movable component; the noise attenuator being disposed within the shell; the noise attenuator occupying space within the shell to decrease acoustic resonance within the shell while permitting free movement of the movable component.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
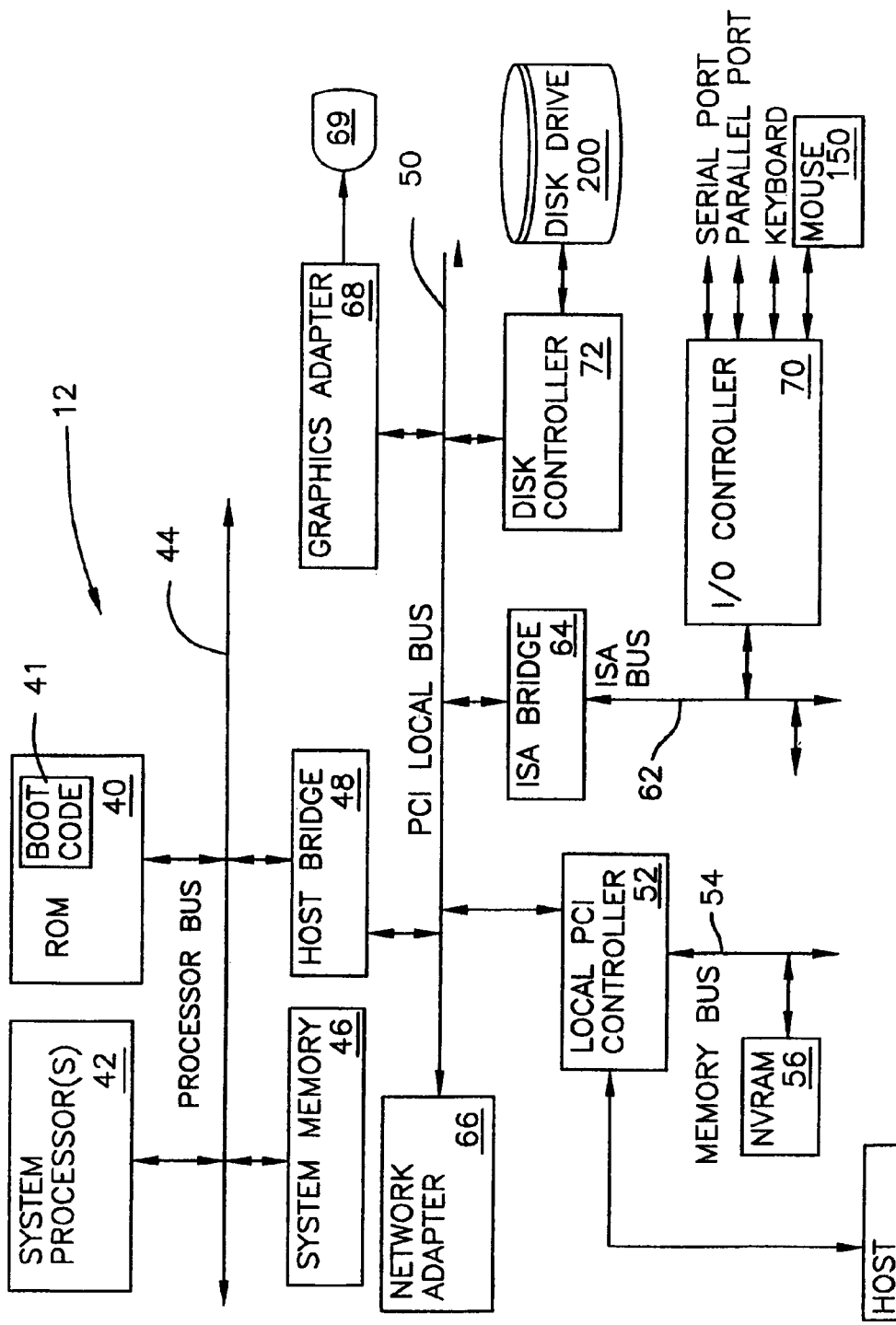
FIG. 1 schematically illustrates a computer system.
Figure 2:
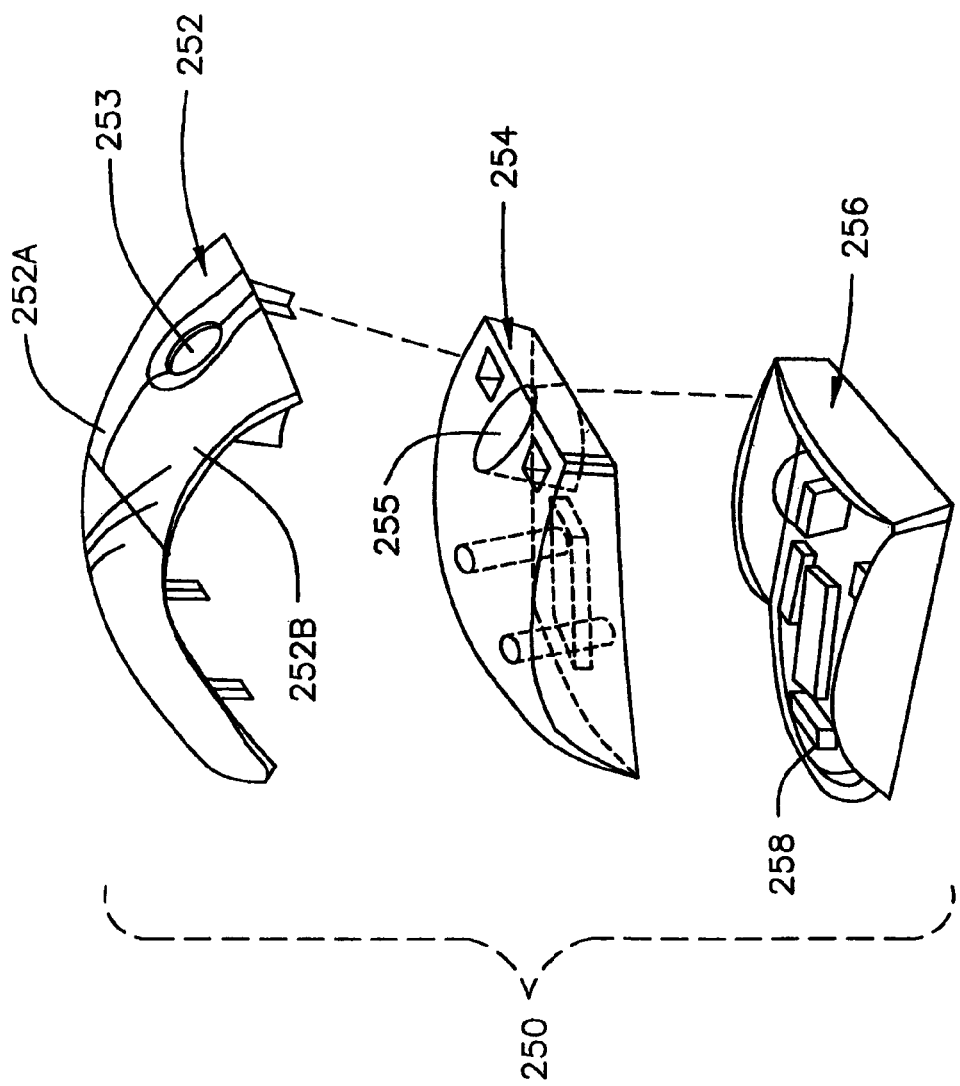
FIG. 2 provides an exploded perspective view of a mouse with a noise-attenuating insert.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

As shown, I/O controller acts to interface with a mouse 150. To this end, I/O controller preferably includes a mouse driver as is well-known to those of ordinary skill in the art.

FIG. 2 provides, in exploded perspective view, a mouse 250 that employs a noise-attenuating insert in accordance with a preferred embodiment of the present invention.

As shown, mouse 250 includes an upper case 252 and a lower case 256 which are configured to interlock with one another (e.g., via form-locking such as via downward extensions of upper case 252 which are accommodated in corresponding recesses of lower case 256); in the present illustrative and non-restrictive example, these combine as a "shell" to define an interior space within the mouse 250. The upper case 252, per convention, preferably includes left and right mouse buttons (252a/b, respectively) which each can be depressed by a user against the resistance of a leaf switch or other switch as described heretofore. As shown, an oval or elliptical aperture 253 can be provided between the buttons which 252a/b to accommodate, as known, control wheel configured for carrying out any of a variety of tasks not normally associated with mouse buttons (e.g., directly scrolling a word processing page up and down, directly zooming into and out of an on-screen picture, etc.).

Lower case 256, for its part, will typically include a PCB (printed circuit board) 258 that is configured for managing or controlling a wide variety of mouse functions.

In accordance with a preferred embodiment of the present invention, a noise-attenuating insert 254 is preferably provided to be disposed within the hollow cavity defined between upper case 252 and lower case 256. Preferably, insert 254 will assume a shape that is sufficient to occupy a significant portion of the interior hollow space (i.e., cavity) of the mouse 250 without interfering with or impinging upon other key components of the mouse. Thus, preferably, recesses and apertures and/or other depressions or spaces may be "sculpted" into (i.e., defined in) the body of insert 254 to permit any and all moving parts of mouse 250 (that define any path of movement within the cavity between upper and lower cases 252/256) to move freely and uninhibitedly and to avoid encroaching upon sensitive components such as PCB 258. By maintaining an adequate clearance with respect to elements of the PCB 258, not only can physical damage to the elements be avoided, but, via the resultant air gap, a degree of heat insulation (against any heat generated by elements of PCB 258) will be afforded to the insert 254. Further, if there is ever a need to open the mouse 250 and inspect components of PCB 258 or other components within mouse 250, an eased temporary removal of the insert 254 away from the vicinity of the PCB 258 (or other elements) will be afforded by virtue of the physical clearances in place.

Accordingly, insert 254 will preferably be dimensioned so as to provide sufficient clearance for buttons 252a/b to be depressed and retracted (as discussed heretofore) and to avoid significant contact with components of PCB 258. Other recesses, apertures, depressions, spaces, etc., may preferably be custom-provided in insert 254 so as to facilitate the accommodation or avoidance of any and all other moving or non-moving mechanical components within mouse 250. For instance, as shown, an ample well or hole 255 may be provided in insert 254 so as to accommodate the rotational movement of a tracking wheel (as may be disposed in hole 253, as discussed heretofore).

It should be appreciated that by providing sufficient physical clearance for the displacement of buttons 252a/b, it will be ensured that at least some minimal clicking sound will be able to resonate within some minimal volume as defined between an upper surface of insert 254 and a lower (or interior) surface of upper case 252. This will assist in providing auditory feedback to a user, to reassure the user that an actuation of one or the other of buttons 252a/b has been successfully executed.

The insert 254 may preferably be formed or molded in essentially any suitable manner, from essentially any suitable noise-attenuating material that preferably successfully attenuates the clicking noise without sacrificing a great deal in cost. Most preferably, a type of sound-dampening foam (open or closed cell) may be employed, Preferably, the material employed for such an insert may be embodied by a sound-dampening foam. Examples include the acoustic-dampening adhesive foam formed from the "DYNAMAT" product of Dynamic Control of North America, Inc. (Hamilton, Ohio) or essentially any type of suitable foam as commonly employed in anechoic chambers. As to the process of molding and/or shaping the material for insert 254, a very wide variety of possibilities exist. Most preferably, a negative-space mold can be designed essentially on any appropriate drawing software, and then a molding process may take place wherein material for the insert is poured or injected into the mold.

In an alternative, a free-standing model of the mouse in question may be obtained, and material for insert 254 could be poured or injected into that mouse; in other words, the mouse would actually serve as a mold. However, this may not be found to be ideal as the aforementioned clearances and other spaces/recesses/depressions/etc. needed to accommodate different parts in the interior of the mouse, and that would need to be imparted to the insert, would not be well represented or embodied merely in the interior of a mouse. In other words, the mouse serving as a model would not, without further modification, be able to replicate on its own the actual dimensions of spaces/recesses/depressions/etc. that would have to be imparted to an insert 254. Accordingly, a dedicated mold for insert 254 would be preferable, though it is conceivable to retrofit or convert a mouse "model" such that additional space could be occupied by solid components in a manner to impart larger dimensions to clearances and spaces/recesses/depressions/etc. to an insert; for instance, a protrusion that connects a mouse upper case with a mouse lower case could be provided with an additional sleeve that increases its effective thickness and thence imparts to an insert an aperture/depression of greater diameter.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
a main memory;
a system processor;
an input/output controller; and
a mouse communicable with said input/output controller;
said mouse comprising:
a shell defining an interior space therewithin;
a movable component which displaces with respect to said shell; and
a noise attenuator which attenuates noise created by said movable component;
said noise attenuator being disposed within said shell;
said noise attenuator occupying space within said shell to decrease acoustic resonance within said shell while permitting free movement of said movable component; wherein: said mouse further comprises a printed circuit board; said noise attenuator occupying a maximum volume of space within said shell to provide a clearance with respect to said printed circuit board.

2. The system according to claim 1, wherein said shell comprises an upper shell portion and a lower shell portion, said upper and lower shell portions combining to define an interior space therewithin.

3. The system according to claim 1, wherein:
said movable component comprises a mouse button; and
said noise attenuator acts to attenuate a clicking noise of said mouse button.

4. An apparatus comprising:
a shell defining an interior space therewithin;
a movable component which displaces with respect to said shell; and
a noise attenuator which attenuates noise created by said movable component;
said noise attenuator being disposed within said shell;
said noise attenuator occupying space within said shell to decrease acoustic resonance within said shell while permitting free movement of said movable component; wherein said noise attenuator comprises noise attenuation material; and said noise attenuation material occupies a maximum volume of space within said shell sufficient for permitting free movement of said movable component;
wherein said apparatus is a mouse;
said mouse further comprises a printed circuit board;
said noise attenuator occupies a volume of space within said shell to provide a clearance with respect to said printed circuit board;
said noise attenuator is custom-designed to accommodate a mouse design and thereby fit readily within otherwise unoccupied interior space of the mouse design to include sufficient spaces between said noise attenuator and said shell of said mouse to permit other moving components to move freely; and
sufficient physical clearance for the displacement of buttons of said mouse is provided by said noise attenuator ensuring that at least some clicking sound will resonate within a volume as defined between an upper surface of said noise attenuator and a lower surface of said shell.

5. The apparatus according to claim 4, wherein said shell comprises an upper shell portion and a lower shell portion, said upper and lower shell portions combining to define an interior space therewithin.

6. The apparatus according to claim 4, wherein:
said movable component comprises a mouse button; and
said noise attenuator acts to attenuate a clicking noise of said mouse button.

7. The apparatus according to claim 4, wherein said noise attenuator comprises noise attenuation material.

8. The apparatus according to claim 7, wherein said noise attenuation material comprises a high-density foam.

9. The apparatus according to claim 4, wherein said noise attenuator occupies a maximum volume of space within said shell sufficient for permitting free movement of said movable component.

10. The apparatus according to claim 9, wherein:
said at least one movable component comprises a mouse button; and
said at least one other moveable component comprises a mouse control wheel.

11. The apparatus according to claim 9, wherein:
said at least one movable component comprises a first mouse button; and
said at least one other movable component comprises a second mouse button.

12. The apparatus according to claim 4, wherein:
said apparatus further comprises a printed circuit board;
said noise attenuator occupying a volume of space within said shell to provide a clearance with respect to said printed circuit board.

13. The apparatus according to claim 4, wherein:
said noise attenuator comprises noise attenuation material; and
said noise attenuation material occupies a maximum volume of space within said shell sufficient for permitting free movement of said movable component.

14. The apparatus according to claim 13, wherein said noise attenuation material further occupies a maximum volume of space within said shell sufficient for permitting free movement of at least one other movable component.

15. The apparatus according to claim 14, wherein:
said at least one movable component comprises a mouse button; and
said at least one other moveable component comprises a mouse control wheel.

16. The apparatus according to claim 14, wherein:
said at least one movable component comprises a first mouse button; and
said at least one other movable component comprises a second mouse button.

17. The apparatus according to claim 13, wherein:
said mouse further comprises a printed circuit board;
said noise attenuation material occupying a volume of space within said shell to provide a clearance with respect to said printed circuit board.

18. The apparatus according to claim 13, wherein said shell comprises an upper shell portion and a lower shell portion, said upper and lower shell portions combining to define an interior space therewithin.

19. The apparatus according to claim 13, wherein said movable component comprises a mouse button.

20. The apparatus according to claim 19, wherein said noise attenuation material acts to attenuate a clicking noise of said mouse button.

21. The apparatus according to claim 20, wherein said noise attenuation material comprises a high-density foam.

22. The apparatus according to claim 13, wherein said noise attenuation material comprises a high-density foam.

* * * * *